(12) United States Patent
Osanai

(10) Patent No.: US 9,681,274 B2
(45) Date of Patent: Jun. 13, 2017

(54) COMMUNICATION DEVICE, NON-TRANSITORY STORAGE MEDIUM, AND CALL CONTROL METHOD

(71) Applicant: KYOCERA Corporation, Kyoto-shi, Kyoto (JP)

(72) Inventor: Takashi Osanai, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/671,915

(22) Filed: Mar. 27, 2015

(65) Prior Publication Data

US 2015/0271650 A1 Sep. 24, 2015

Related U.S. Application Data

(63) Continuation of application No. PCT/JP2013/076023, filed on Sep. 26, 2013.

(30) Foreign Application Priority Data

Sep. 27, 2012 (JP) ................. 2012-214339

(51) Int. Cl.
*H04M 3/42* (2006.01)
*H04W 4/10* (2009.01)
(Continued)

(52) U.S. Cl.
CPC .......... *H04W 4/10* (2013.01); *H04L 5/16* (2013.01); *H04M 3/56* (2013.01); *H04W 4/08* (2013.01);
(Continued)

(58) Field of Classification Search
CPC ...................................... H04W 4/10
(Continued)

(56) References Cited

U.S. PATENT DOCUMENTS

2001/0034225 A1* 10/2001 Gupte ............... H04L 12/587
455/412.2
2006/0154683 A1 7/2006 Umezawa et al.
(Continued)

FOREIGN PATENT DOCUMENTS

JP 2005-278109 A 10/2005
JP 2006-222876 A 8/2006
(Continued)

OTHER PUBLICATIONS

Written Opinion of the International Searching Authority issued by Japan Patent Office for International Application No. PCT/JP2013/076023.
(Continued)

*Primary Examiner* — Tilahun B Gesesse
(74) *Attorney, Agent, or Firm* — Procopio Cory Hargreaves and Savitch LLP

(57) ABSTRACT

A communication device has a function to make a group call to a plurality of other communication devices in a half-duplex communication system. The communication device includes: a receiving module configured to, after the communication device makes a call to start the group call and the other communication device at the called side make an automatic reply to the incoming call, receive first notification information transmitted from the other communication device according to a first notification operation performed by a user of the other communication device, the first notification information including first identification information configured to identify the other communication device; and a notification execution module configured to make a notification that a user of the other communication device identified based on the first identification information participates in the group call.

12 Claims, 15 Drawing Sheets

(51) Int. Cl.
  *H04M 3/56* (2006.01)
  *H04W 4/12* (2009.01)
  *H04L 5/16* (2006.01)
  *H04W 4/08* (2009.01)
  *H04W 68/00* (2009.01)
(52) U.S. Cl.
  CPC .......... *H04W 4/12* (2013.01); *H04W 68/005* (2013.01); *H04M 2250/62* (2013.01)
(58) Field of Classification Search
  USPC ........................................................ 455/518
  See application file for complete search history.

(56) References Cited

U.S. PATENT DOCUMENTS

| | | | | |
|---|---|---|---|---|
| 2006/0246934 | A1* | 11/2006 | Patel | H04L 63/104 455/519 |
| 2008/0003999 | A1 | 1/2008 | Sung et al. | |
| 2008/0299950 | A1* | 12/2008 | Wu | H04M 3/53375 455/413 |
| 2009/0131092 | A1* | 5/2009 | Kaida | H04W 4/08 455/518 |
| 2010/0273516 | A1 | 10/2010 | Sung et al. | |
| 2013/0150115 | A1* | 6/2013 | Maggenti | H04M 1/656 455/518 |
| 2014/0113672 | A1* | 4/2014 | Lindner | H04W 4/10 455/518 |

FOREIGN PATENT DOCUMENTS

| | | |
|---|---|---|
| JP | 2006-197116 A | 7/2007 |
| JP | 2009-055564 A | 3/2009 |
| JP | 2009-540664 A | 11/2009 |
| WO | 2009/063563 A1 | 5/2009 |

OTHER PUBLICATIONS

International Search Report dated Dec. 3, 2013 issued in counterpart International Application No. PCT/JP2013/076023.

* cited by examiner

CONTACT INFORMATION LIST SCREEN

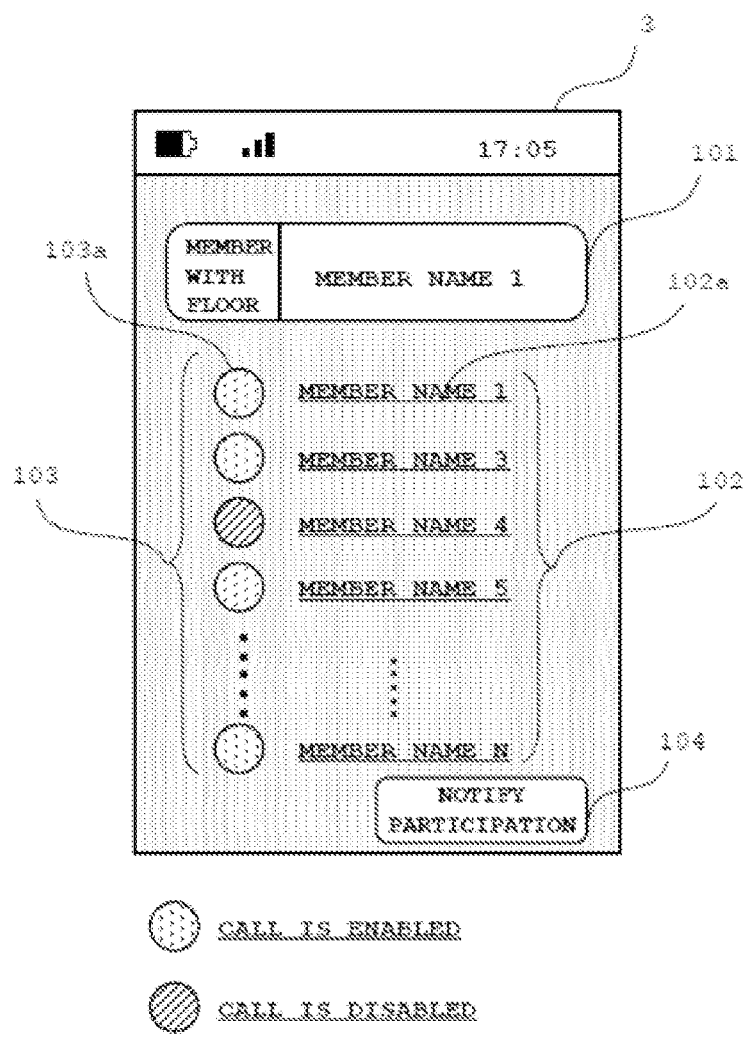

PARTICIPATION MAIL DETERMINATION PROCESS

PARTICIPATION NOTIFICATION PROCESS

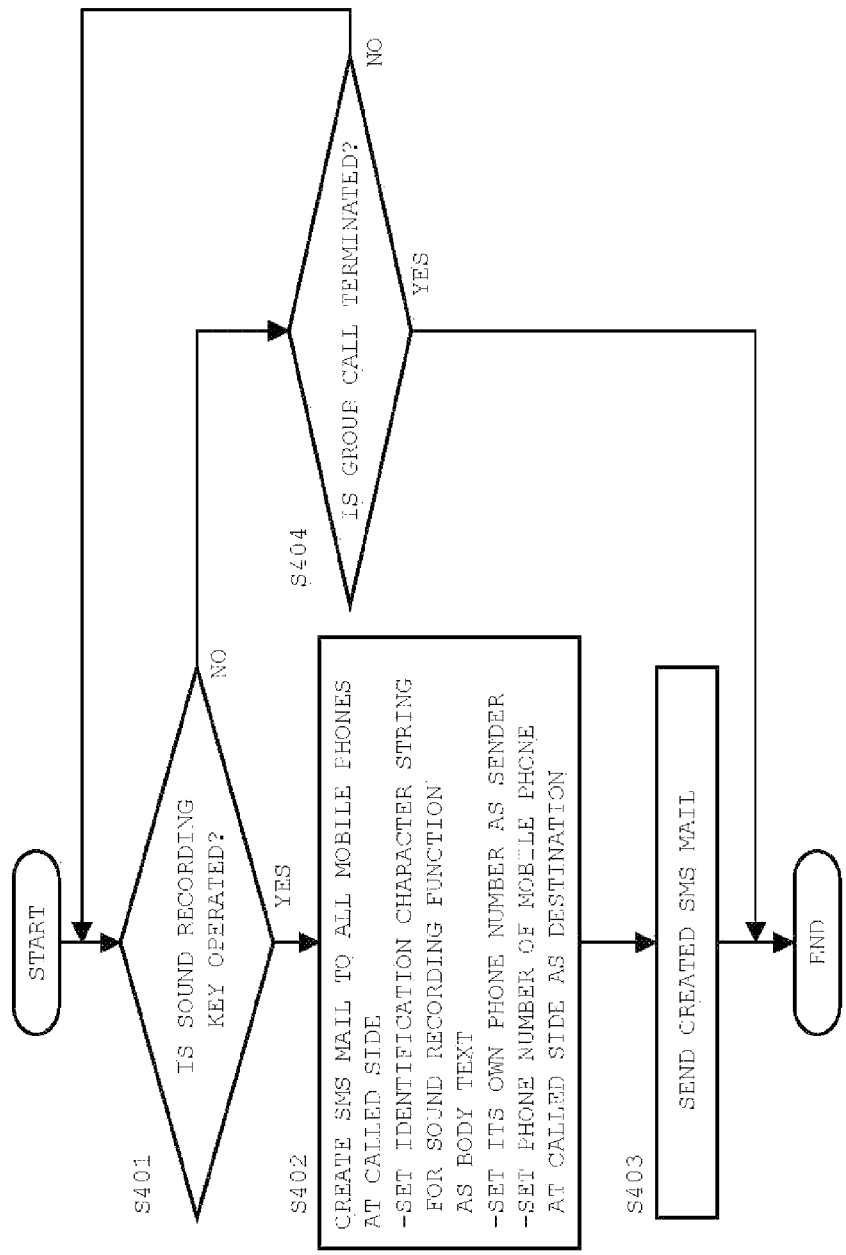

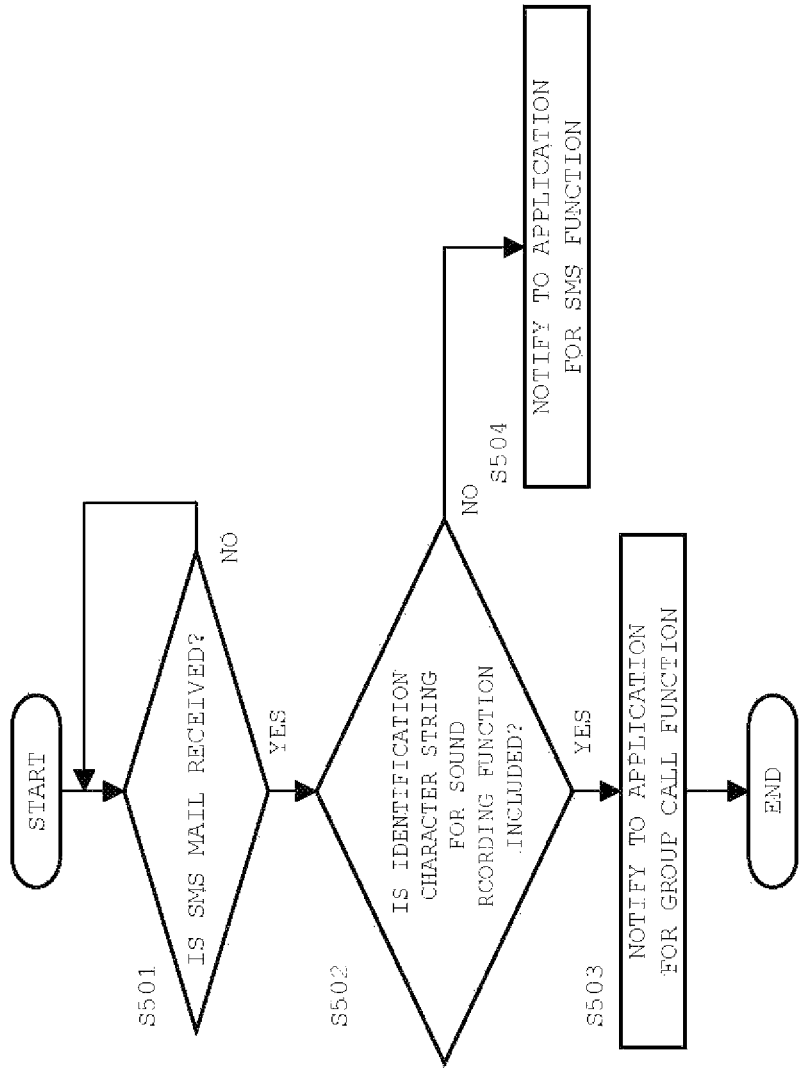

COMMUNICATION DEVICE, NON-TRANSITORY STORAGE MEDIUM, AND CALL CONTROL METHOD

This application claims priority under 35 U.S.C. Section 119 of Japanese Patent Application No. 2012-214339 filed Sep. 27, 2012, entitled "COMMUNICATION DEVICE, PROGRAM AND TELEPHONE CALL CONTROL METHOD". The disclosure of the above application is incorporated herein by reference.

FIELD

Embodiments of the present disclosure relate to a communication device. Embodiments of the present disclosure also relate to a non-transitory storage medium holding computer programs preferably used in such a communication device, and a calling control method preferably used in such a communication device.

BACKGROUND

Conventionally, there is known a mobile phone with a group call function to make a call to a plurality of persons in a half-duplex communication system called Push To Talk (hereinafter, referred to as PTT). In a group call to be made by such a group calling function, when the send button in a mobile phone is pressed, the floor is granted to the mobile phone. While the send button is pressed and held, sound can be sent to other phones.

When a user to make a group call performs a calling operation designating the phone numbers of the plurality of communication partners, the phones designated by the phone numbers is called via a server managing the call. When the called phones make a reply to the incoming call, the group call is enabled among all of the mobile phone having performed calling operation and the phones having replied to the call.

The group call function is assumed to be used to transfer information unilaterally from a person at the calling side to a plurality of persons at the called side, such as in the situation in which an operation supervisor provides working instructions to a plurality of workers. In such a usage mode, it is inconvenient that the persons at the called side need to make a reply each time the persons get an incoming call. Accordingly, for the foregoing group call function, there may be a mechanism that allows a reply to be automatically made from the phones at the called side to the incoming call without requiring the persons at the called side to perform a reply operation, unlike when making a reply to an incoming call at a general phone.

SUMMARY

A first aspect of the present disclosure relates to a communication device with a function to make a group call to a plurality of other communication devices in a half-duplex communication system. The communication device according to the aspect is provided with a receiving module configured to, after the communication device makes a call to start the group call and the other communication device at the called side make an automatic reply to the incoming call, receive first notification information transmitted from the other communication device according to a first notification operation performed by a user of the other communication device, the first notification information including first identification information configured to identify the other communication device; and a notification execution module configured to make a notification that a user of the other communication device identified based on the first identification information participates in the group call.

A second aspect of the present disclosure relates to a storage medium that holds a computer program in a non-transitory manner. The computer program is applied to a computer of a communication device with the function to make a group call to a plurality of other communication devices in a half-duplex communication system. The program provides the computer of the communication device with a function to, after the communication device makes a call to start the group call and the other communication device at the called side make an automatic reply to the incoming call, upon receipt of notification information transmitted from the other communication device according to a notification operation performed by a user of the other communication device, the notification information including identification information configured to identify the other communication device, acquire the identification information from the received notification information, and a function to make a notification that a user of the other communication device specified by the acquired identification information participates in the group call.

A third aspect of the present disclosure relates to a call control method in a communication device with a function to make a group call to a plurality of other communication devices in a half-duplex communication system. The communication control method according to the aspect includes, after the communication device makes a call to start the group call and the other communication device at the called side make an automatic reply to the incoming call, upon receipt of notification information transmitted from the other communication device according to a notification operation performed by a user of the other communication device, the notification information including identification information configured to identify the other communication device, acquiring the identification information from the received notification information; and making a notification that a user of the other communication device specified by the acquired identification information participates in the group call.

BRIEF DESCRIPTION OF THE DRAWINGS

These and other objects, and novel features of the present disclosure will become more apparent upon reading the following detailed description of the embodiment along with the accompanying drawings.

FIG. 7 is an illustration of a diagram illustrating a call screen for a group call to be displayed on a display surface of a mobile phone at the called side in the embodiment;

FIG. 11 is an illustration of a flowchart describing a sound recording mail transmission process to be performed on the mobile phone at the calling side in the modification example;

FIG. 12 is an illustration of a flowchart describing a sound recording mail determination process to be performed on the mobile phone at the called side in the modification example;

Figure 1A:
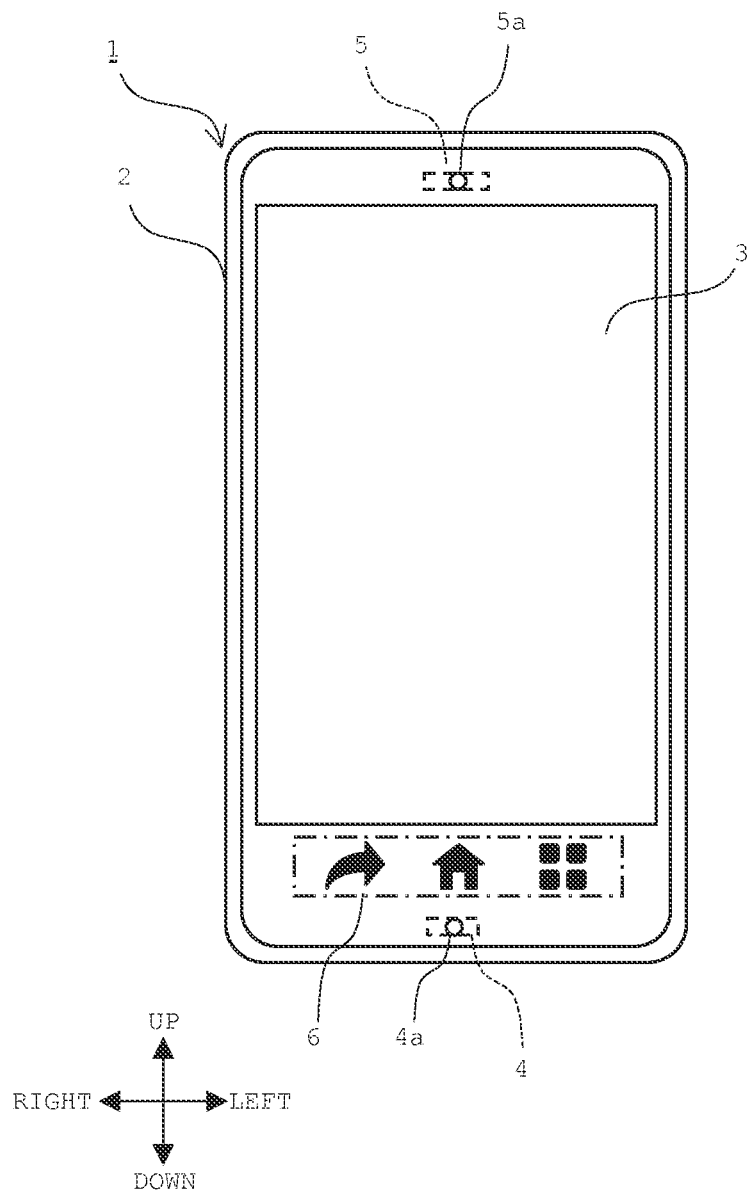
FIG. 1A to FIG. 1C are illustrations of diagrams illustrating a configuration of a mobile phone according to an embodiment of the disclosure.

The drawings are provided mainly for describing the present disclosure, and do not limit the scope of the present disclosure.

DESCRIPTION OF PREFERRED EMBODIMENTS

In the following, an embodiment of the disclosure is described referring to the drawings.

Figure 1B:
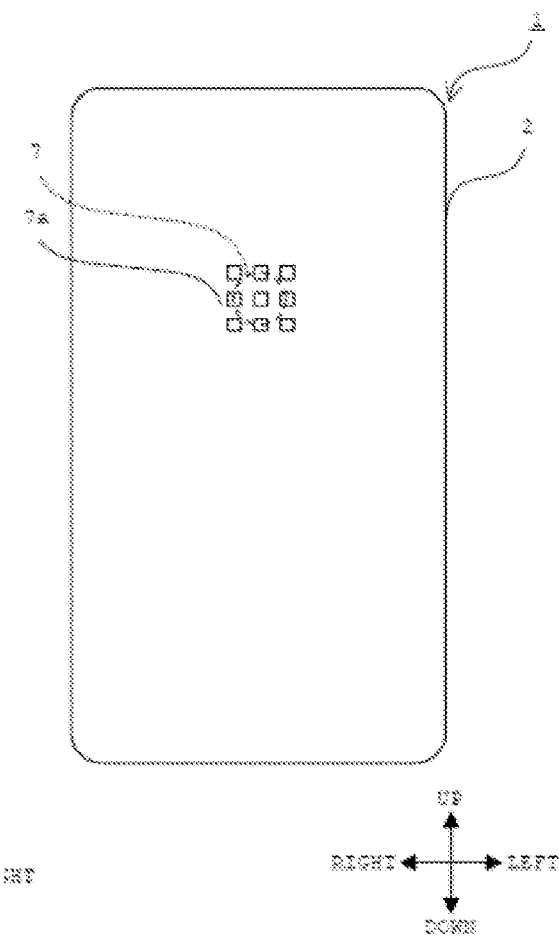
Figure 1C:
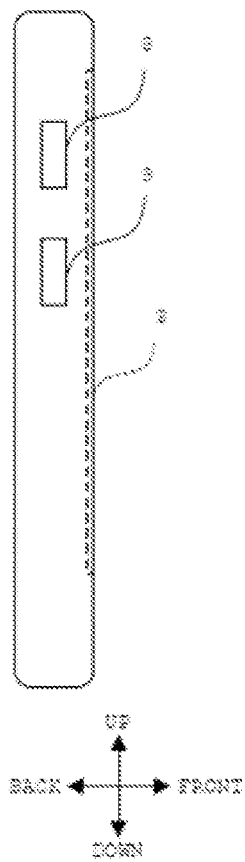

FIG. 1A to FIG. 1C are illustrations of diagrams illustrating a configuration of a mobile phone 1. FIG. 1A and FIG. 1B are respectively a front view and a rear view of the mobile phone 1. FIG. 1C is a left side view of the mobile phone 1.

In the following, to simplify the description, as illustrated in FIG. 1A to 1C, the long side direction of a cabinet 2 is defined as up and down directions, and the short side direction of the cabinet 2 is defined as left and right directions.

The mobile phone 1 may be provided with the cabinet 2, a display surface 3, a microphone 4, a call speaker 5, a key operation part 6, an external speaker 7, a first key 8, and a second key 9.

The cabinet 2 may have a substantially rectangular contour when viewed from the front side. The display surface 3 of a display module 13 to be described later may be disposed on the front surface of the cabinet 2. Various images (screens) are displayed on the display surface 3.

The microphone 4 may be disposed at a lower end within the cabinet 2, and the call speaker 5 may be disposed at an upper end within the cabinet 2. Sound is input into the microphone 4 through a microphone hole 4*a* formed in the front surface of the cabinet 2. The microphone 4 generates an electrical signal in accordance with input sound. Sound is output from the call speaker 5. Sound output from the call speaker 5 is released to the outside through an output hole 5*a* formed in the front surface of the cabinet 2.

The key operation part 6 may be disposed on the front surface of the cabinet 2. The key operation part 6 may be constituted of a plurality of operation keys. Various functions for operating a program being executed are assigned to the operation keys.

The external speaker 7 may be disposed in the cabinet 2. Output holes 7*a* associated with the external speaker 7 are formed in the back surface of the cabinet 2. Sound (voice, alarm, or the like) output from the external speaker 7 is released to the outside through the output holes 7*a*.

A first key 8 and a second key 9 may be disposed on a left side surface of the cabinet 2. The first key 8 is assigned with a function as a call key to be operated to make a call for a group call described later and a function as a send key to be operated to send sound to other members' phones during the group call. The second key 9 is assigned with a function as an end key to end the group call.

Figure 2:
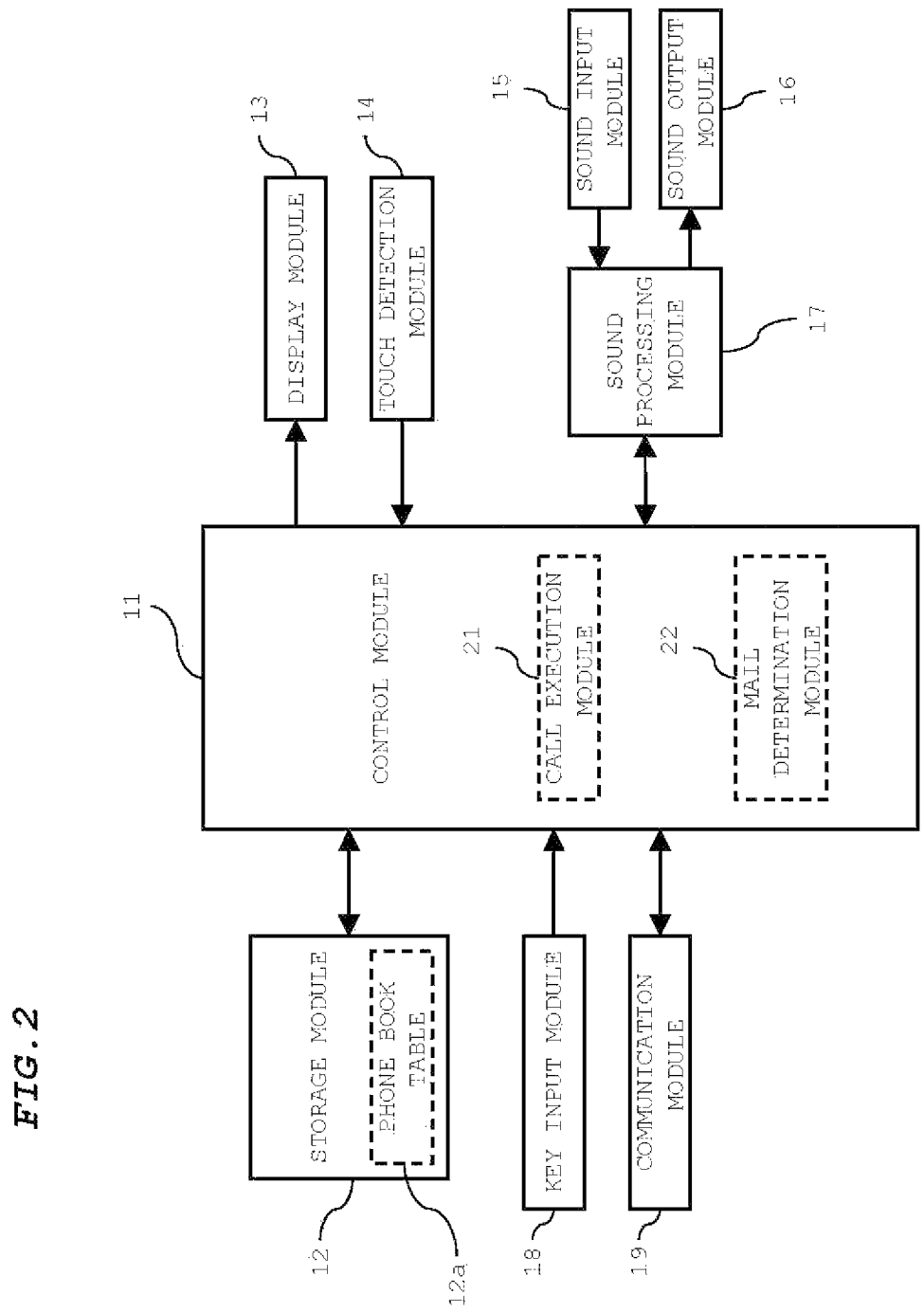
FIG. 2 is an illustration of a block diagram illustrating the entire configuration of the mobile phone in the embodiment.

FIG. 2 is an illustration of a block diagram illustrating the entire configuration of the mobile phone 1. The mobile phone 1 may be provided with a control module 11, a storage module 12, the display module 13, a touch detection module 14, a sound input module 15, a sound output module 16, a sound processing module 17, a key input module 18, and a communication module 19.

The storage module 12 may be constituted of an ROM, an RAM, an external memory, and the like. The storage module 12 stores therein various programs. The programs stored in the storage module 12 include, in addition to a control program for controlling the modules of the mobile phone 1, various applications (e.g. applications relating to a phone, an email, a phone book, a map, a game, and a schedule management). The programs may be stored in the storage module 12 when the mobile phone 1 is manufactured by the manufacturer, or may be stored in the storage module 12 by the user via a communication network or a storage medium.

The storage module 12 also may include a working area in which data to be temporarily used or generated is stored when a program is executed.

The storage module 12 stores a phone book table 12*a*. Contact information of communication partners is registered in the phone book table 12*a*. The contact information includes contact information related to the communication partners such as names, phone numbers, email addresses, and addresses, and other information of the communication partners such as images expressing the communication partners, and the birthdays of the communication partners and hobbies of the communication partners. The user executes an application for the phone book and uses a predetermined registration screen to enter contact information of each of the communication partners. The entered contact information is registered in the phone book table 12*a*.

The control module 11 may be constituted of a CPU and the like. The control module 11 controls the modules constituting the mobile phone 1 (such as the storage module 12, the display module 13, the touch detection module 14, the sound input module 15, the sound output module 16, the sound processing module 17, the key input module 18, and the communication module 19) in accordance with a program.

The display module 13 may be constituted of a liquid crystal display and the like. The display module 13 displays an image (a screen) on the display surface 3, based on a control signal and an image signal from the control module 11. The display module 13 may be constituted of the display device such as an organic EL display, in place of a liquid crystal display.

The touch detection module 14 may be constituted of a touch panel configured to detect touch of the display surface 3 by the fingertip. The touch panel may be formed of a transparent sheet-like member, and may be disposed on the front surface of the cabinet 2 while covering the display surface 3. The touch panel may be any one of various types of touch panels such as an electrostatic capacitive touch panel, an ultrasonic touch panel, a pressure sensitive touch panel, a resistive touch panel, and a photosensitive touch panel.

The touch detection module 14 receives a user's touch operation with respect to the display surface 3. Specifically, the touch detection module 14 detects a position on the display surface 3 where the fingertip has touched as a touch position, and outputs a position signal in accordance with the detected touch position to the control module 11. Since the display surface 3 is covered with a touch panel, a user touches indirectly the display surface 3 by the fingertip. In the embodiment, the user's indirect touch on the display surface 3 via the touch panel refers to "touching (contacting) the display surface 3 by the fingertip."

The user is allowed to perform various touch operations by touching the display surface 3 by the fingertip. Examples of the touch operations are a tap operation, a flick operation, and a slide operation. The tap operation is an operation of touching the display surface 3 by the fingertip, and then releasing the fingertip from the display surface 3 within a short time. The flick operation is an operation of flipping the display surface 3 in an arbitrary direction with the fingertip. The slide operation is an operation of moving the fingertip on the display surface 3 in an arbitrary direction while keeping the fingertip in contact with the display surface 3.

The touch operations are described in detail. For instance, after a touch position with respect to the display surface 3 is detected by the touch detection module 14, when the touch position cannot be detected any more within a predetermined first time, the control module 11 determines that a tap operation has been performed. After a touch position with respect to the display surface 3 is detected by the touch detection module 14 and the touch position is moved by a predetermined first distance or more within a predetermined second time, when the touch position cannot be detected any more, the control module 11 determines that a flick operation has been performed. After a touch position with respect to the display surface 3 is detected by the touch detection module 14, when the touch position is moved by a predetermined second distance or more, the control module 11 determines that a slide operation has been performed.

The sound input module 15 may be constituted of the microphone 4 and the like. The sound input module 15 outputs an electrical signal from the microphone 4 to the sound processing module 17.

The sound output module 16 may be constituted of the call speaker 5 and the external speaker 7. The sound output module 16 receives an electrical signal from the sound processing module 17, and outputs sound (voice, alarm, or the like) from the call speaker 5 or from the external speaker 7.

The sound processing module 17 performs e.g. A/D conversion to an electrical signal from the sound input module 15, and outputs a digital sound signal which has undergone A/D conversion to the control module 11. The sound processing module 17 performs e.g. a decoding process and D/A conversion to the digital sound signal output from the control module 11, and outputs an electrical signal which has undergone D/A conversion to the sound output module 16.

The key input module 18 outputs, to the control module 11, a signal associated with each one of the operation keys when the operation keys in the key operation part 6 are pressed. Further, when the first key 8 or the second key 9 is pressed, the key input module 18 outputs, to the control module 11, a signal associated with the pressed key.

The communication module 19 may be provided with a circuit for converting a signal, and an antenna for transmitting and receiving a radio wave in order to make a phone call or to perform communication. The communication module 19 converts a signal to be input from the control module 11 for a phone call or for communication into a wireless signal, and transmits the converted wireless signal to a communication destination such as a base station or another communication device via the antenna. Further, the communication module 19 converts the wireless signal received via the antenna into a signal of a format that can be processed by the control module 11, and outputs the converted signal to the control module 11.

The mobile phone 1 of the embodiment includes a group call function for phone calls with a plurality of persons in a PTT communication system. The mobile phone 1 contains an application for executing the group call function. The control module 11 executes the group call function according to the application.

The control module 11 may include a call execution module 21 and a mail determination module 22. The call execution module 21 executes control processes related to the group call function, such as a participation mail transmission process and a participation notification process described later. The mail determination module 22 executes a participation mail determination process described later.

Figure 3:
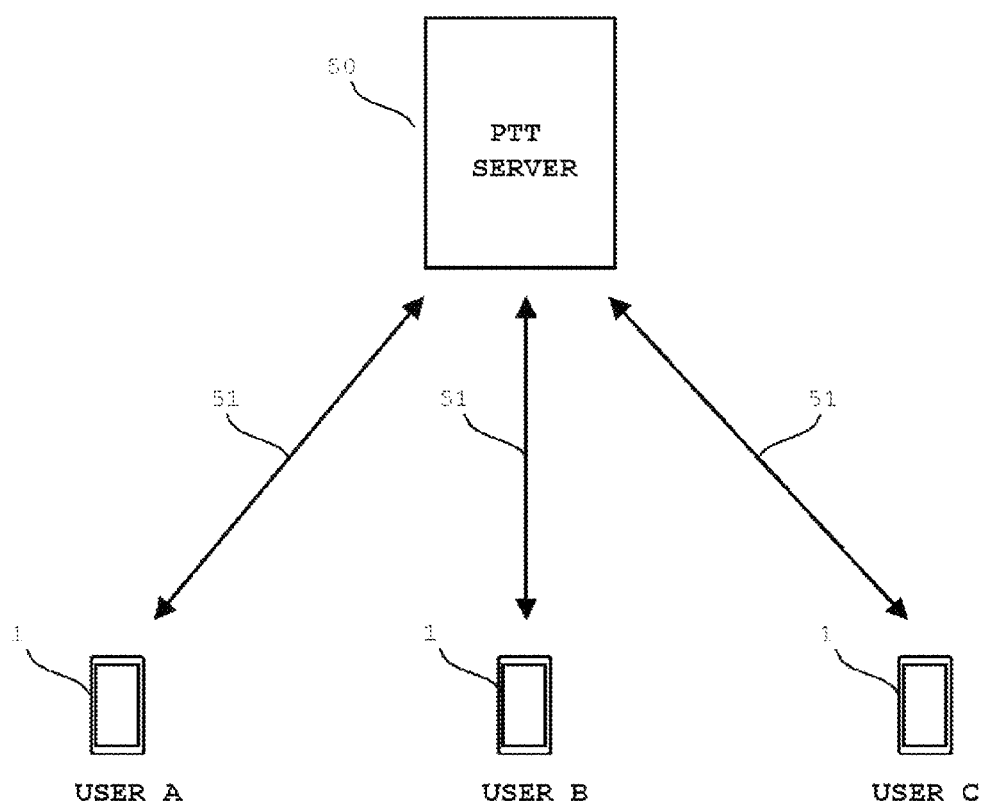
FIG. 3 is an illustration of a diagram for describing that a plurality of mobile phones is connected by communication paths via a PTT server during a group call in the embodiment.

A group call in the PTT communication system (hereinafter, referred to as simply group call) is managed by a PTT server. As illustrated in FIG. 3, when a group call is performed among a plurality of users using the mobile phones 1, the mobile phones 1 of the users are connected by communication paths 51 (phone network) via a PTT server 50.

Figure 4:
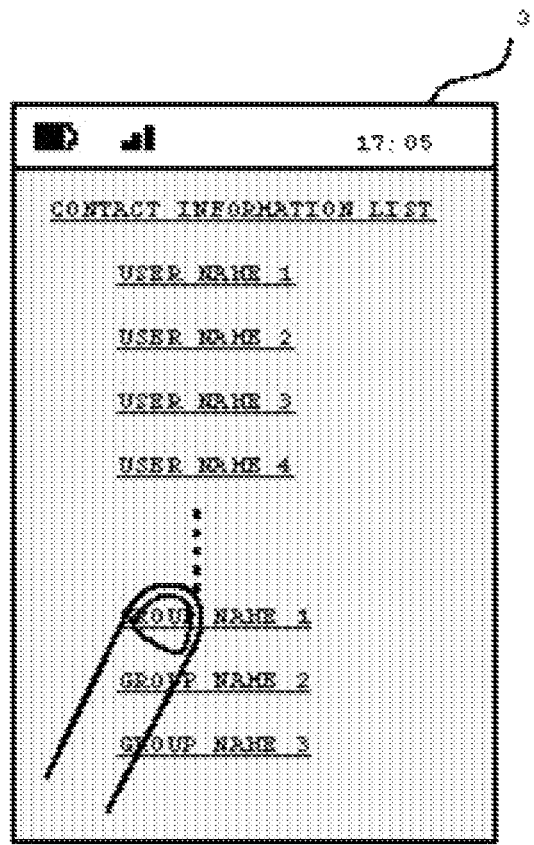
FIG. 4 is an illustration of a diagram illustrating a state in which a contact information list screen is displayed on a display surface in the embodiment.

To perform a group call, the user starts an application for the address book to display a contact information list screen as illustrated in FIG. 4 on the display surface 3, for example. The user creates in advance a group for a group call composed of a plurality of members, from the contact information registered in the phone book table 12a. Not only the names of the individual registered users' name but also the names of groups as targets of group calls are displayed on the contact information list screen. The user selects any of the group names on the contact information list screen and presses the first key 8 as a send key to start a group call.

Figure 5:
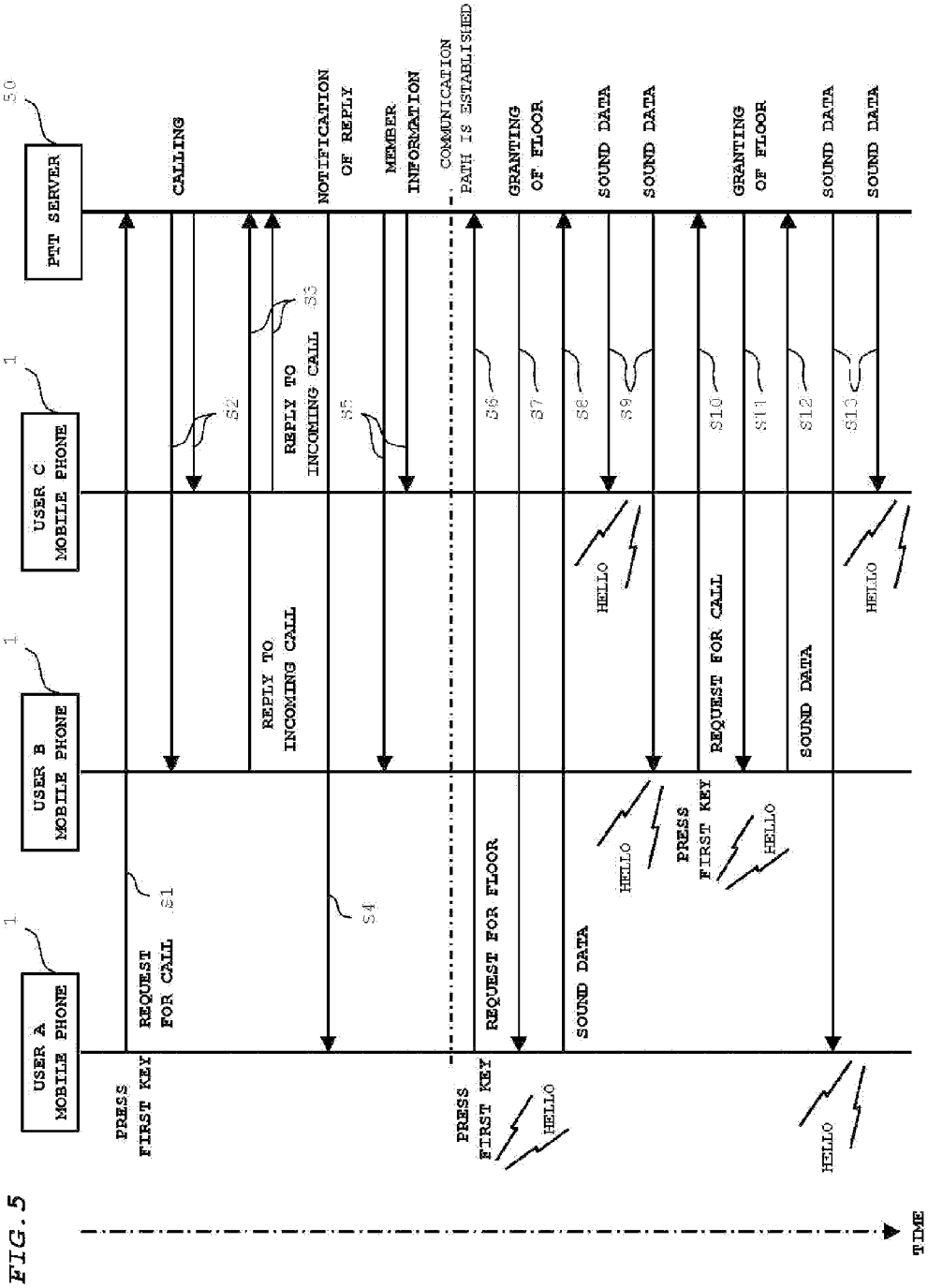
FIG. 5 is an illustration of a flowchart describing basic processing operations of group call functions in the embodiment.

FIG. 5 is an illustration of a diagram describing basic processing operations of group call functions. Hereinafter, the basic process operations of a group call using the plurality of mobile phones 1 will be described with reference to FIG. 5. FIG. 5 illustrates an example of a group call performed among three users.

When a user A to start the group call presses the first key 8 on his/her mobile phone 1, the call execution module 21 of the mobile phone 1 of the user A reads the phone numbers of the members in the group from the phone book table 12a, and sends a call request signal together with the read phone numbers to the PTT server 50 (S1). The PTT server 50 sends a call signal to the mobile phones 1 of a user B and a user C as members of the group call, according to the received phone numbers (S2). Each of the call execution modules 21 of the mobile phones 1 having received the call signal automatically returns a reply signal to the PTT server 50 (S3). If the call signal does not reach the mobile phone 1 at the called side because the mobile phone 1 at the called side is out of service, for example, the mobile phone 1 returns no reply signal to the PTT server 50.

Upon receipt of the reply signal from each of the mobile phones 1 at the called side, the PTT server 50 sends a reply notification signal to the mobile phone 1 at the calling side (S4). The reply notification signal includes information indicative of the presence or absence of a reply from each of the mobile phones 1 at the called side. Further, the PTT server 50 sends to each of the mobile phones 1 at the called side member information including the phone number of the other mobile phone 1 at the called side and information indicative of the presence or absence of a reply (S5). When the communication paths 51 are established between the mobile phone 1 at the calling side and the mobile phones 1 at the called side which have replied to the call, the group call is enabled.

For example, when the user A speaks, the user A speaks while pressing and holding the first key 8 on his/her mobile phone 1. The voice sound of the user A is input into the control module 11 through the microphone 4. When the first key 8 as a send key is pressed, the call execution module 21 of the mobile phone 1 of the user A sends a floor request signal to the PTT server 50 (S6). When no floor is given to any of the other mobile phones 1, the PTT server 50 sends a floor signal to the mobile phone 1 of the user A (S7). When the floor is given, the call execution module 21 of the mobile phone 1 of the user A sends sound data to the PTT server 50 (S7).

Upon receipt of the sound data from the mobile phone 1 of the user A with the floor (S8), the PTT server 50 sends the received sound data to the mobile phones 1 of the user B and the user C without the floor (S9). Upon receipt of the sound data, each of the call execution modules 21 of the mobile phones 1 of the user B and the user C causes the call speaker 5 to output the voice sound of the user A according to the sound data. The floor request signal is sent while the first key 8 is pressed and held. When the first key 8 is no longer pressed and the floor signal is no longer sent, the PTT server 50 cancels the granting of the floor.

Similarly, when the user B speaks while pressing and holding the first key 8 on his/her mobile phone 1, the floor is granted to the user B according to the floor request signal (S10, S11), and the sound data from the mobile phone 1 of the user B is sent to the mobile phones 1 of the user A and the user C (S12, S13). Accordingly, the voice sound of the user B is output from the speakers 5 of the mobile phones 1 of the user A and the user C.

For example, when the user A as a caller presses the second key 9 on his/her mobile phone 1, the communication paths 51 among all of the mobile phones 1 are disconnected by the PTT server 50 to terminate the group call. Otherwise, when the time during which none of the mobile phones 1 sends the floor request signal to the PTT server 50 exceeds a prescribed time, the PTT server 50 disconnects the communication paths 51 among all of the mobile phones 1 to terminate the group call.

When each of the mobile phones 1 receives a call signal for a group call as described above, the call execution module 21 automatically sends a reply signal even when the user does not perform a reply operation for receiving the call, unlike in the case of a phone. Accordingly, call state is established even though the member at the called side does not have the mobile phone 1 at hand. Thus, the member at the calling side cannot know whether the member at the called side actually participates in the group call.

The mobile phone 1 of the embodiment thus has a participation notification function for notifying the member at the called side actually participating in the group call. Hereinafter, the participation notification function will be described.

Figure 6A:
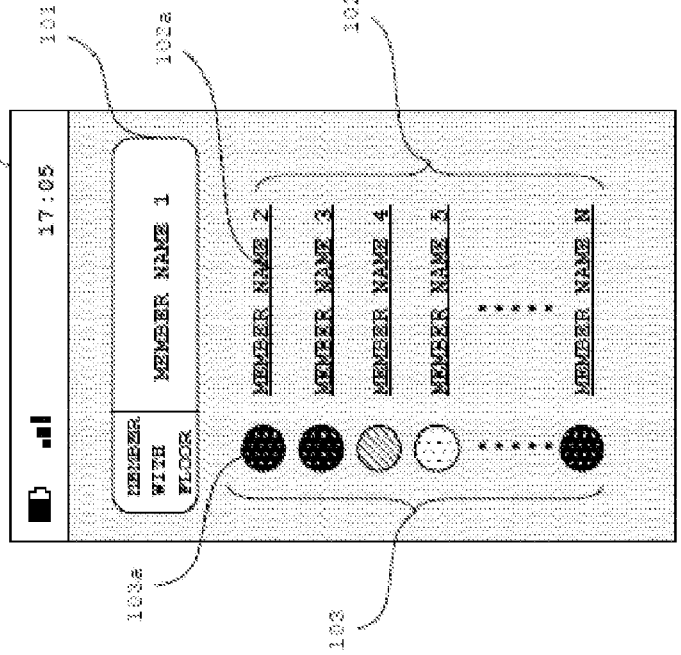
FIGS. 6A and 6B are illustrations of diagrams illustrating call screens for a group call to be displayed on a display surface of a mobile phone at the calling side in the embodiment.
Figure 6B:
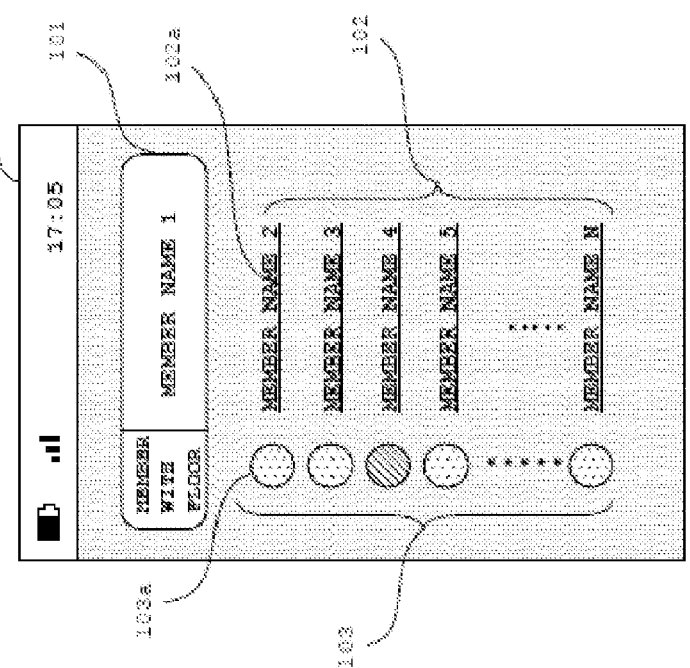

FIGS. 6A and 6B are illustrations of diagrams illustrating call screens for a group call to be displayed on the display surface 3 of the mobile phone 1 at the calling side. FIG. 6A is an illustration of a diagram illustrating a call screen before the status of members' participation is notified to a status notification field 103. FIG. 6B is an illustration of a diagram illustrating a call screen after the status of the members' participation is notified to the status notification field 103. FIG. 7 is an illustration of a diagram illustrating a call screen for a group call to be displayed on the display surface 3 of the mobile phone 1 at the called side. Hereinafter, the call screen for a group call to be displayed on the display surface 3 of the mobile phone 1 at the calling side will be referred to as "call screen at the calling side," and the call screen for a group call to be displayed on the display surface 3 of the mobile phone 1 at the called side will be referred to as "call screen at the called side."

When a group call is enabled by establishment of the communication paths 51, the call execution module 21 of the mobile phone 1 at the calling side (hereinafter, referred to as "the call execution module 21 at the calling side") displays the call screen at the calling side on the display surface 3. As illustrated in FIG. 6A, the call screen at the calling side includes a floor-granted member display box 101 in which the name of the member with the floor is displayed, a member name list field 102 in which a list of the names of the members of the group call is displayed, and a status notification field 103 in which the status of the group call for each of the members is notified. The member name list field 102 represents the member names 102a of the mobile phones 1 at the called side to make the group call. The status notification field 103 is composed of status markers 103a corresponding to the member names 102a that are arranged next to the member names 102a.

After displaying the call screen at the calling side, the call execution module 21 at the calling side displays the status markers 103a of the members having made a reply, in a color indicating that the group call is enabled (for example, yellow), and displays the status markers 103a of the members having not made a reply, in a color indicating that the group call is disabled (for example, red), according to the information indicative of the presence or absence of a reply in the reply notification signal from the PTT server 50.

Although not illustrated in FIG. 5, the PTT server 50 sends to all of the mobile phones 1 information on the mobile phone 1 with the floor at the time. Each time the mobile phone 1 with the floor is changed, the call execution module 21 at the calling side displays the name of the member with the floor in the floor-granted member display box 101.

When the group call is enabled by establishment of the communication path 51, the call execution module 21 of the mobile phone 1 at the called side (hereinafter, referred to as "the call execution module 21 at the called side") displays the call screen at the called side on the display surface 3.

As illustrated in FIG. 7, the call screen at the called side includes a participation notification key 104 as well as the floor-granted member display box 101, the member name list field 102, and the status notification field 103. The participation notification key 104 is operated to notify the member at the calling side that the member at the called side participates in the group call.

The call execution module 21 at the called side displays the status markers 103a of the members in colors indicating that the group call is enabled or disabled, according to the information indicating the presence or absence of a reply in the member information from the PTT server 50. The call execution module 21 at the called side also displays the name of the member with the floor in the floor-granted member display box 101.

When being capable of participation in the group call, the member at the called side performs an operation with respect to the participation notification key 104, for example, a tap operation, as a notification operation. The call execution module 21 at the called side sends an SMS (Short Message Service) mail as a text message to the mobile phone 1 at the calling side according to the notification operation.

The call execution module 21 at the calling side acquires the phone number as sender information from the sent SMS mail, and displays the status marker 103a of the member corresponding to the acquired phone number in a color indicating that the member participates in the group call (for example, green) as illustrated in FIG. 6B. The member at the calling side checks the status markers 103a of the members on the call screen at the calling side to grasp the members at the called side actually participating in the group call.

Figure 8:
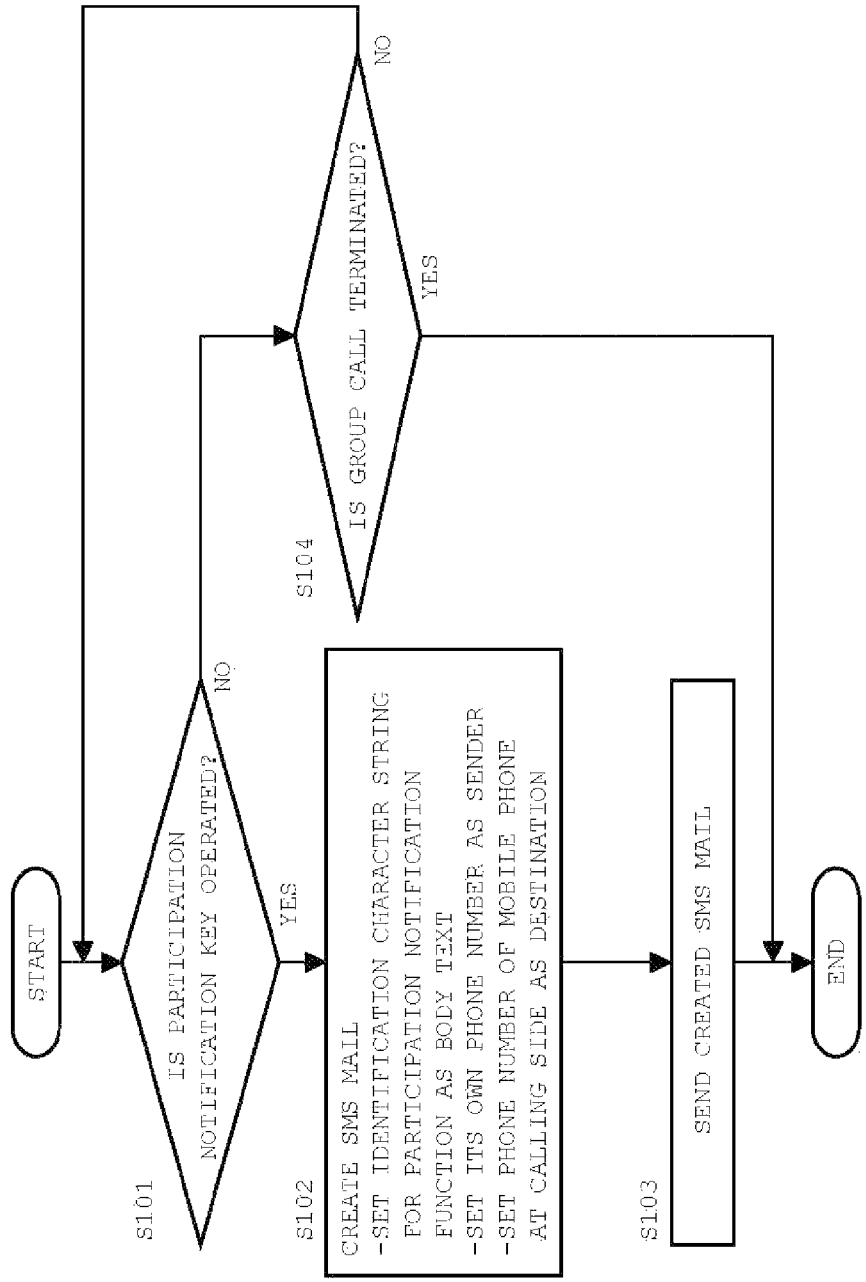
FIG. 8 is an illustration of a flowchart describing a participation mail transmission process to be performed on the mobile phone at the called side in the embodiment.
Figure 9A:
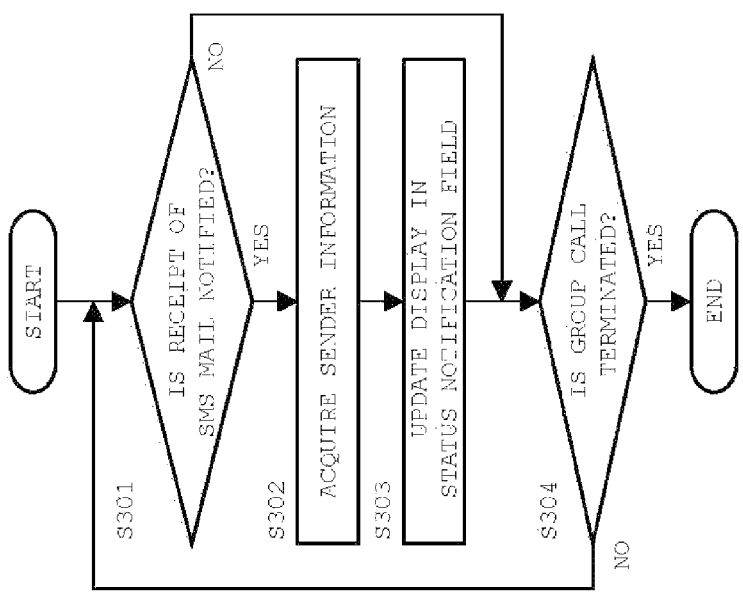
FIGS. 9A and 9B are illustrations of flowcharts describing a participation mail determination process and a participation notification process to be performed on the mobile phone at the calling side in the embodiment.
Figure 9B:
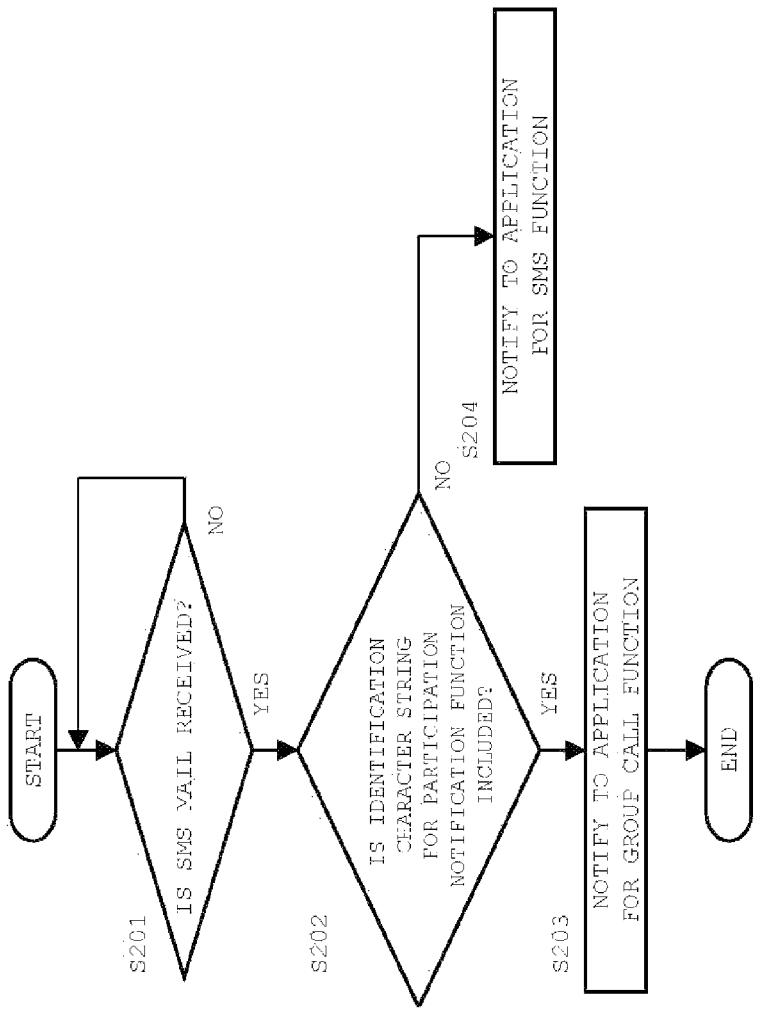

Hereinafter, descriptions will be given as to specific control processes related to the participation notification function in the mobile phone 1 at the called side and the mobile phone 1 at the calling side with reference to the flowcharts of FIGS. 8, 9A, and 9B. FIG. 8 is an illustration of a flowchart of a participation mail transmission process to be performed in the mobile phone 1 at the called side. FIG. 9A is an illustration of a flowchart of a participation mail determination process to be performed in the mobile phone 1 at the calling side. FIG. 9B is an illustration of a flowchart of a participation notification process to be performed in the mobile phone 1 at the calling side. The call execution module 21 executes the participation mail transmission process and the participation notification process, and the mail determination module 22 executes the participation mail determination process.

Referring to FIG. 8, the participation mail transmission process will be described. In the mobile phone 1 at the called side, the call execution module 21 monitors whether the participation notification key 104 on the call screen at the called side is operated during the group call (S101). When the participation notification key 104 is operated (S101: YES), the call execution module 21 creates an SMS mail (S102). At that time, the call execution module 21 sets an identification character string for the participation notification function to the head of the body text of the SMS mail. The identification character string for the participation notification function is an identification character string for the mobile phone 1 at the calling side to determine that the SMS mail is a special message related to the participation notification function, which is set to "//PTT MESSAGE," for example. The call execution module 21 further sets its own phone number as the sender of the SMS mail, and sets the phone number of the mobile phone 1 at the calling side as the destination of the SMS mail. The created SMS mail is used as participation notification information to be sent from the mobile phone 1 at the called side to the mobile phone 1 at the calling side to notify the member at the calling side that the member at the called side participates in the group call.

When completing the creation of the SMS mail, the call execution module 21 sends the created SMS mail (S103). When completing the sending of the SMS mail, the call execution module 21 terminates the participation mail transmission process. Further, when the group call is ended without operation of the participation notification key 104 (S104: YES), the call execution module 21 terminates the participation mail transmission process.

Referring to FIG. 9A, the participation mail determination process will be described. In the mobile phone 1 at the calling side, the mail determination module 22 monitors whether the SMS mail is received by the communication module 19 (S201). Upon receipt of the SMS mail (S201: YES), the mail determination module 22 determines whether the received SMS mail is participation notification information, depending on whether the SMS mail includes the identification character string for the participation notification function "//PTT MESSAGE" (S202).

When determining that the received SMS mail is participation notification information because of the inclusion of the identification character string for the participation notification function (S202: YES), the mail determination module 22 notifies the receipt of the SMS mail to the call execution module 21 executing the application for the group call function, that is, this application (S203).

Meanwhile, when determining that the received SMS mail is not participation notification information because of the non-inclusion of the identification character string for the participation notification function (S202: NO), the mail determination module 22 notifies the receipt of the SMS mail to the application for the SMS function (S204).

Referring to FIG. 9B, the participation notification process will be described. In the mobile phone 1 at the calling side, the call execution module 21 monitors whether the receipt of the SMS mail is notified by the mail determination module 22 during the group call (S301). When the receipt of the SMS mail is notified (S301: YES), the call execution module 21 acquires the phone number as sender information from the notified SMS mail (S302).

The call execution module 21 updates the display in the status notification field 103 on the call screen according to the acquired phone number (S303). Specifically, the call execution module 21 identifies the member having notified participation in the group call from the acquired phone number, and displays the status marker 103a of the identified member in a color indicating that the member participates in the group call, as illustrated in FIG. 6B.

At the end of the group call (S304: YES), the call execution module 21 terminates the participation notification process.

As described above, when the participation notification key 104 is operated in each of the mobile phones 1 at the called side, in the call screen on the mobile phone 1 at the calling side, the status marker 103a of the member corresponding to the mobile phone 1 in which the participation notification key 104 is operated is changed in sequence from the color indicating that the group call is enabled to the color indicating that the member participates in the group call.

As described above, according to the embodiment, the status notification field 103 on the call screen at the calling side notifies that the member (user) at the called side participates in the group call. This allows the member (user) at the calling side to grasp whether the members at the called side can listen to the member at the calling side.

Further, according to the embodiment, the SMS mail is used as participation notification information indicating that the member at the called side participates in the group call.

This allows the mobile phone 1 at the called side to send the participation notification information to the mobile phone 1 at the calling side not through the PTT server 50. Accordingly, there is no need for the PTT server 50 to have the function of relaying the participation notification information, which realizes the participation notification function in an easy manner.

Modification Example

A mobile phone 1 of a modification example includes a sound recording function for recording sound received during a group call as well as the participation notification function described above in relation to the embodiment.

Figure 10A:
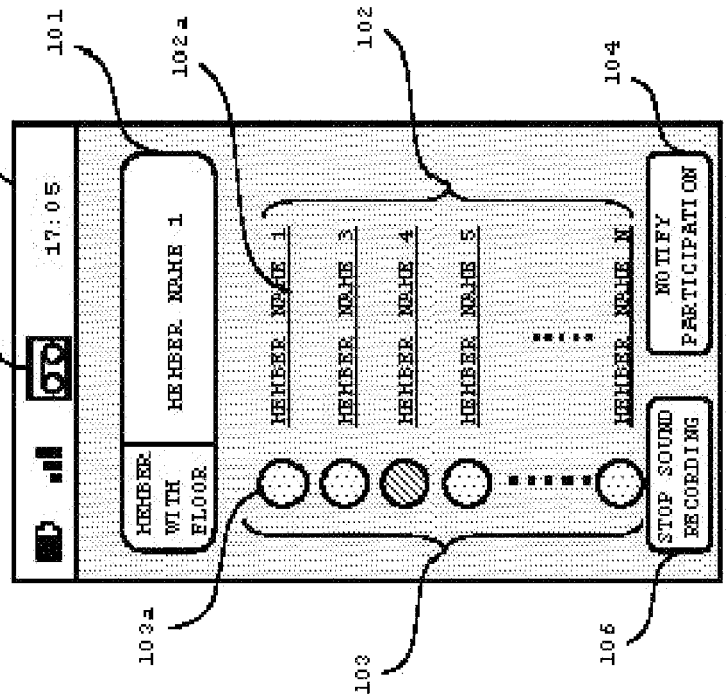
FIGS. 10A and 10B are illustrations of diagrams illustrating a call screen for a group call to be displayed on a display surface of a mobile phone at a calling side and a call screen for a group call to be displayed on a display surface of a mobile phone at a called side in a modification example.
Figure 10B:
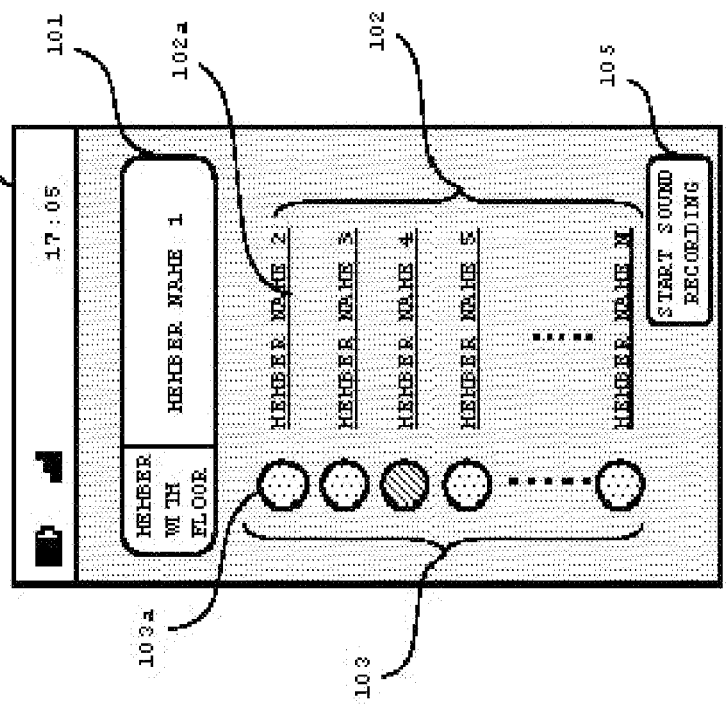

FIG. 10A is an illustration of a diagram illustrating a call screen for a group call to be displayed on the display surface 3 of the mobile phone 1 at the calling side. FIG. 10B is an illustration of a diagram illustrating a call screen for a group call to be displayed on the display surface 3 of the mobile phone 1 at the called side.

As illustrated in FIG. 10A, the call screen at the calling side in the modification example includes a sound recording start key 105 as well as the floor-granted member display box 101, the member name list field 102, and the status notification field 103. The sound recording start key 105 is operated by the member at the calling side to start recording the received sound during the group call in the mobile phone 1 at the called side.

As illustrated in FIG. 10B, the call screen at the called side in the modification example includes a sound recording stop key 106 as well as the floor-granted member display box 101, the member name list field 102, the status notification field 103, and the participation notification key 104. The sound recording stop key 106 is operated by the member at the called side to stop recording of the received sound during the group call.

For example, in the case where the member at the calling side wishes to carry his/her speech reliably to the members at the called side, when the group call becomes enabled, the member at the calling side performs an operation with respect to the sound recording start key 105, for example, a tap operation, as a command operation. The call execution module 21 at the calling side sends an SMS (Short Message Service) mail as a text message to all of the mobile phones 1 at the called side according to the command operation.

Upon receipt of the SMS mail according to the command operation, the call execution module 21 at the called side starts to record the sound received at the communication module 19 and the speech sound input into the microphone 4. As illustrated in FIG. 10B, when the sound recording is started, a notification icon 107 indicative of sound recording is displayed in a pictographic display region on the call screen.

To stop the sound recording, the member at the called side performs an operation with respect to the sound recording stop key 106, for example, a tap operation. In addition, to notify his/her participation in the group call, the member at the called side performs an operation with respect to the participation notification key 104. When the sound recording stop key 106 or the participation notification key 104 is operated, the call execution module 21 at the called side stops the sound recording.

Figure 13:
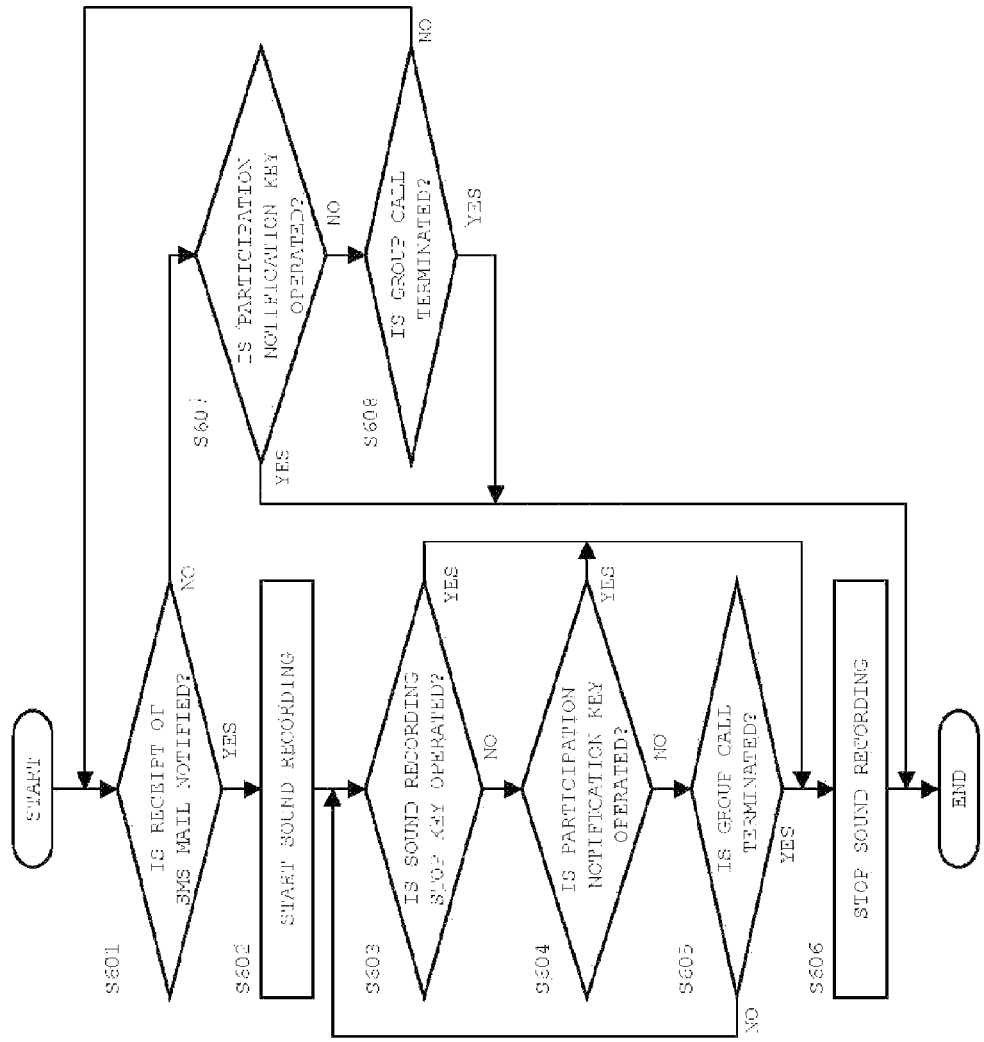
FIG. 13 is an illustration of a flowchart describing a sound recording process to be performed on the mobile phone at the called side in the modification example.

Hereinafter, descriptions will be given as to specific processes related to the sound recording function in the mobile phone 1 at the called side and the mobile phone 1 at the calling side with reference to flowcharts of FIGS. 11 to 13. FIG. 11 is an illustration of a flowchart describing a sound recording mail transmission process to be performed in the mobile phone 1 at the calling side. FIG. 12 is an illustration of a flowchart describing a sound recording mail determination process to be performed in the mobile phone 1 at the called side. FIG. 13 is an illustration of a flowchart describing a sound recording process to be performed in the mobile phone 1 at the called side. The call execution module 21 executes the sound recording mail transmission process and the sound recording process. The mail determination module 22 executes the sound recording mail determination process.

Referring to FIG. 11, the sound recording mail transmission process will be described. In the mobile phone 1 at the calling side, the call execution module 21 monitors whether the sound recording start key 105 on the call screen at the calling side is operated during the group call (S401). When the sound recording start key 105 is operated (S401: YES), the call execution module 21 creates an SMS mail to all of the mobile phones 1 at the called side being capable of the group call (S402). At that time, the call execution module 21 sets an identification character string for the sound recording function to the head of the body text of the SMS mail. The identification character string for the sound recording function is an identification character string for the mobile phone 1 at the called side to recognize that the SMS mail is a special message related to the sound recording function, which is set to "//PTT RECORD," for example. The call execution module 21 also sets its own phone number as the sender of the SMS mail, and sets the phone number of the mobile phone 1 at the called side as the destination of the SMS mail. The created SMS mail is used as sound recording command information to instruct the mobile phones 1 at the called side to record received sound.

When the creation of the SMS mail is completed, the call execution module 21 sends the created SMS mail (S403). When the sending of the SMS mail is completed, the call execution module 21 terminates the sound recording mail transmission process. Meanwhile, when the group call is ended without operation of the sound recording start key 105 (S404: YES), the call execution module 21 terminates the sound recording mail transmission process.

Referring to FIG. 12, the sound recording mail determination process will be described. In the mobile phone 1 at the called side, the mail determination module 22 monitors whether the SMS mail is received at the communication module 19 (S501). When the SMS mail is received (S501: YES), the mail determination module 22 determines whether the received SMS mail is sound recording command information depending on whether the SMS mail includes the identification character string for the sound recording function "//PTT RECORD" (S502).

When determining that the received SMS mail is sound recording command information because of the inclusion of the identification character string for the sound recording function (S502: YES), the mail determination module 22 notifies the receipt of the SMS mail to the call execution module 21 executing an application for the group call function, that is, this application (S503).

Meanwhile, when determining that the received SMS mail is not sound recording command information because of the non-inclusion of the identification character string for the sound recording function (S502: NO), the mail determination module 22 notifies the receipt of the SMS mail to the application for the SMS function (S504).

Referring to FIG. 13, the sound recording process will be described. In the mobile phone 1 at the called side, the call execution module 21 monitors whether the receipt of the SMS mail is notified by the mail determination module 22 (S601). When the receipt of the SMS mail is notified (S601: YES), the call execution module 21 starts to record received sound and speech sound (S602). At that time, the call execution module 21 displays the notification icon 107 in the pictographic display region on the call screen (refer to FIG. 10B). The recorded sound is stored with date and time information in the storage module 12.

The call execution module 21 monitors whether the sound recording stop key 106 is operated, whether the participation notification key 104 is operated, and whether the group call is terminated (S603, S604, and S605). When the sound recording stop key 106 is operated, the participation notification key 104 is operated, or the group call is ended (S603: YES, S604: YES, or S605: YES), the call execution module 21 stops the sound recording (S606) and terminates the sound recording process. When stopping the sound recording, the call execution module 21 erases the notification icon 107 from the pictographic display region.

Further, when the participation notification key 104 is operated or the group call is ended before the receipt of the SMS mail is notified by the mail determination module 22 (S607: YES or S608: YES), the call execution module 21 terminates the sound recording process.

Figure 14B:
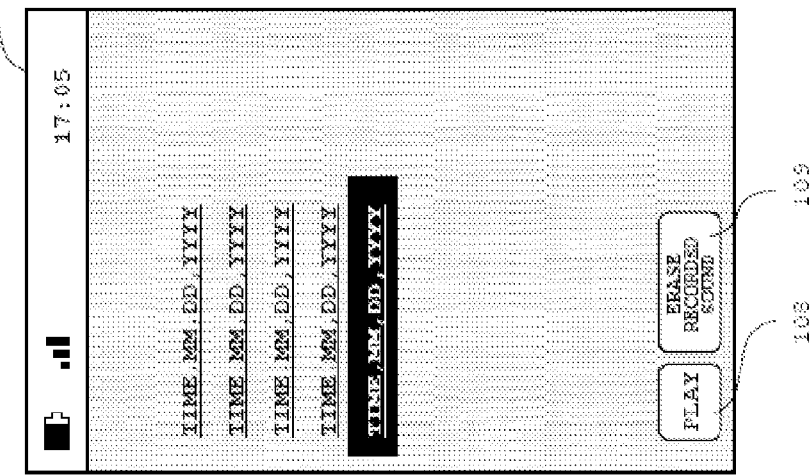
FIGS. 14A and 14B are illustrations of diagrams illustrating a call screen at the called side after stoppage of sound recording and a list screen of sound recording files created during a group call.
Figure 14A:
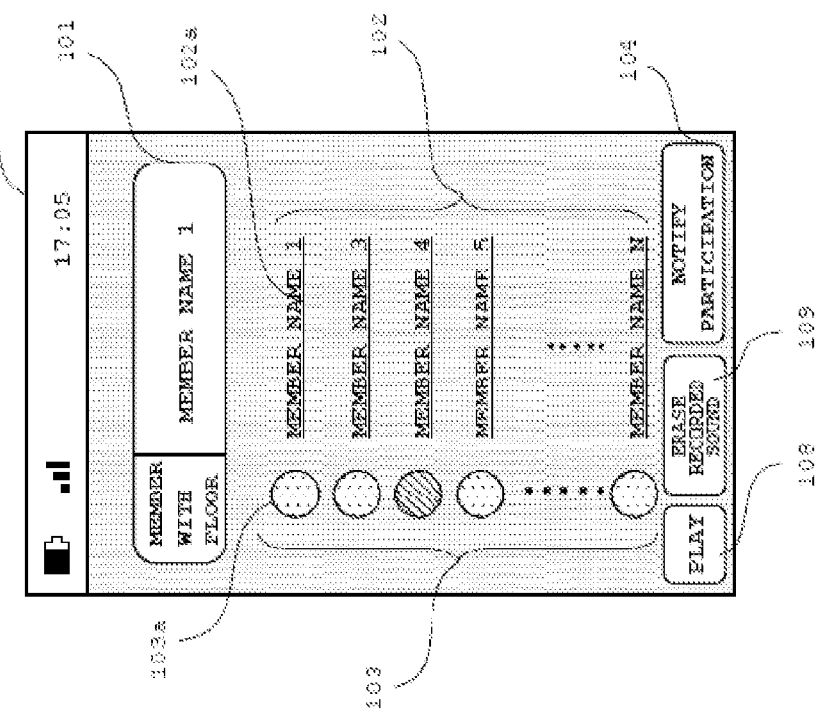

FIG. 14A is an illustration of a diagram illustrating a call screen at the called side after stoppage of sound recording. When stopping the sound recording and terminating the sound recording process, the call execution module 21 displays a play key 108 and a recorded sound erase key 109 on the call screen at the called side, instead of the sound recording stop key 106. When the play key 108 is operated (for example, a tap operation), the call execution module 21 causes the call speaker 5 to play the recorded sound. Meanwhile, when the recorded sound erase key 109 is operated (for example, a tap operation), the call execution module 21 erases the recorded sound.

FIG. 14B is an illustration of a diagram illustrating a list screen of sound recording files created during a group call. When a predetermined operation is performed after the end of the call, the list screen of the sound recording file illustrated in FIG. 14B is displayed on the display surface 3. The sound recording files are discriminated by the recording date and time. When one of the sound recording files is specified and then the play key 108 is operated, the sound in the specified sound recording file is played. When one of the sound recording files is specified and then the recorded sound erase key 109 is operated, the specified sound recording file is erased.

As described above, according to the modification example, the sound received during the group call can be recorded in the mobile phone 1 at the called side. Accordingly, even though the member at the called side does not have the mobile phone 1 at hand when the member (user) at the calling side speaks, the content of the speech can be carried to the member (user) at the called side.

In addition, in the modification example, when the participation notification key 104 is operated and the member at the called side participates in the group call, the sound recording is automatically stopped to suppress unnecessary sound recording.

Further, in the modification example, the mobile phone 1 at the called side starts sound recording when the sound recording start key 105 is operated in the mobile phone 1 at the calling side. Accordingly, the member at the calling side can cause the mobile phone 1 at the called side to record his/her speech as necessary. This suppresses unnecessary sound recording.

Furthermore, in the modification example, the mobile phone 1 at the calling side uses an SMS mail to send sound recording command information to the mobile phone 1 at the called side not through the PTT server 50. This eliminates the need for the function of passing the sound recording command information to the PTT server 50, which realizes the sound recording function in an easy manner.

OTHERS

As in the foregoing, the embodiment of the present disclosure is described. However, the present disclosure is not limited by the foregoing embodiment. In addition, the embodiment of the subject disclosure may be modified in various ways other than the foregoing one.

For example, in the foregoing embodiment, it is notified that the user of the mobile phone 1 at the called side participates in the group call in the status notification field 103 on the call screen at the calling side displayed in the mobile phone 1 at the calling side. Alternatively, it may be notified that the user(s) of the mobile phone(s) 1 at the called side other than its own mobile phone 1 participate in the group call in the status notification field 103 on the call screen at the called side displayed in the mobile phone 1 at the called side. In this case, the mobile phone 1 at the called side sends the SMS mail as participation notification information to not only the mobile phone 1 at the calling side but also the other mobile phones 1 at the called side. In addition, in the mobile phone 1 at the called side, the participation mail transmission process and the participation notification process are performed.

Further, in the foregoing embodiment, the one each status marker 103a in the status notification field 103 notifies whether the mobile phone 1 at the called side is capable of a group call and whether the member at the called side participates in the group call. However, the mode of notifying whether the member at the called side participates in the group call is not limited to the mode in the foregoing embodiment. For example, separately from the status marker notifying whether the mobile phone 1 at the called side is capable of a group call, another status marker notifying whether the member at the called side participates in the group call may be arranged on the call screen. Otherwise, instead of providing another status marker, for example, the member name 102a in the member name list field 102 may be changed in color to notify whether the member at the called side participates in the group call.

Further, in the foregoing embodiment, the SMS mail is used as participation notification information. However, instead of the SMS mail, other email, for example, MMS (Multimedia Message Service) mail may be used as participation notification information, for example. In addition, the email may not be necessarily used but the participation notification information may be sent through the PTT server 50 from the mobile phone 1 at the called side to the mobile phone 1 at the calling side. In this case, the mobile phone 1 at the calling side does not need to perform the participation mail determination process, whereas the PTT server 50 needs to be provided with an additional function of relaying the participation notification information.

Similarly, in the foregoing modification example, email other than SMS mail, such as MMS mail, may be used as sound recording command information. Alternatively, the sound recording information may be sent through the PTT server 50 from the mobile phone 1 at the calling side to the mobile phone 1 at the called side.

Further, in the foregoing modification example, the SMS mail as sound recording command information is sent from the mobile phone 1 at the calling side by the operation of the sound recording start key 105, and upon the receipt of the SMS mail, the mobile phone 1 at the called side starts to record the received sound. Alternatively, the mobile phone 1 at the calling side may not be provided with the sound recording start key 105. In this case, when the communication path 51 is established to enable the group call, the mobile phone 1 at the called side automatically starts sound recording.

Furthermore, in the foregoing modification example, when the sound recording stop key 106 or the participation notification key 104 is operated, the recording of the received sound is stopped. Alternatively, the mobile phone 1 in the foregoing modification example may be configured to stop the sound recording when the sound recording stop key 106 is operated but not to stop the sound recording even when the participation notification key 104 is operated. Otherwise, the mobile phone 1 in the foregoing modification example may not be provided with the sound recording stop key 106 and may be configured to stop the sound recording when the participation notification key 104 is operated.

In the foregoing embodiment, when the communication path 51 is established between the mobile phone 1 at the calling side and the mobile phone 1 at the called side and the user of the mobile phone 1 at the calling side with the floor speaks, the voice sound of the user is output from the call speaker 5 of the mobile phone 1 at the called side. In this case, when a predetermined period of time has elapsed without the operation of the participation notification key 104 in the mobile phone 1 at the called side, the voice sound of the user at the calling side may be muted or lowered in volume. Specifically, when the sound is output from the call speaker 5 of the mobile phone 1 at the called side for a predetermined period of time but remains unattended without the operation of the participation notification key 104, it is conceivable that the user of the mobile phone 1 at the called side is in no situation to listen to the caller, such as when the user is not near the mobile phone 1, for example. In this case, therefore, the sound may be muted or lowered in volume from the viewpoints of preventing annoyance to people around the mobile phone 1 and avoiding divulgation of information. The recording of the sound is enabled even when the sound is muted or lowered in volume.

The disclosure is not limited to a mobile phone, but may be applied to various communication devices with a phone call function, such as a phone, a PDA (Personal Digital Assistant), a tablet PC, and an electronic book terminal with a phone calling function.

The disclosed embodiment may be changed or modified in various ways as necessary within the technical scope of the claims of the disclosure hereinafter defined.

What is claimed is:

1. A communication device with a function to participate in a group call with a plurality of other communication devices in a half-duplex communication system, the communication device comprising at least one processor configured to:
    automatically accept a first incoming group call even when a user of the communication device does not perform any operation for receiving the first group call;
    receive an instruction from another communication, that initiated the first group call, to record sound received during the first group call;
    in response to the instruction, automatically begin recording sound received during the first group call in a memory of the communication device;
    when an operation indicating that the user is participating in the first group call is received during the first group call, notify the other communication device that initiated the first group call that the user is participating in the first group call; and,
    when the first group call is terminated while the sound is still being recorded, automatically stop the recording.

2. The communication device according to claim 1, wherein notifying the other communication device comprises sending a message to the other communication device, and wherein the message comprises identification information.

3. The communication device according to claim 2, wherein the message is a Short Message Service (SMS) message or a Multimedia Message Service (MMS) message.

4. The communication device according to claim 2, wherein the identification information comprises an identification character string to identify a sender of the message.

5. The communication device according to claim 1, further comprising a display, wherein the at least one processor is further configured to:
    initiate a second group call with a plurality of other communication devices; and,
    when the at least one processor initiates the second group call,
    receive one or more notifications from one or more of the plurality of other communication devices, wherein each of the one or more notifications indicates that a user of one of the one or more other communication devices is participating in the second group call, and
    display, on the display, information identifying each user of each of the plurality of other communication devices, and indicating whether or not each user of each of the plurality of other communication devices is participating in the second group call based on the one or more notifications.

6. The communication device according to claim 5, wherein the at least one processor is further configured to, during the second group call, in response to a command operation by the user of the communication device, instruct at least one of the plurality of other communication devices to begin recording sound received during the second group call at the at least one other communication device.

7. The communication device according to claim 6, wherein instructing the at least one other communication device to begin recording comprises sending either a Short Message Service (SMS) message or a Multimedia Message Service (MMS) message to the at least one other communication device.

8. The communication device according to claim 1, wherein the at least one processor is further configured to automatically stop the sound recording when the operation indicating that the user is participating in the first group call is received.

9. The communication device according to claim 1, wherein the instruction from the other communication device is a message that comprises identification information.

10. The communication device according to claim 9, wherein the identification information comprises an identification character string to indicate the instruction to record sound received during the first group call.

11. A non-transitory storage medium holding a computer program for a computer of a communication device with a function to participate in a group call with a plurality of other communication devices in a half-duplex communication system, wherein the computer program is configured to, when executed by a processor, cause the processor to:
- automatically accept an incoming group call even when a user of the communication device does not perform any operation for receiving the group call;
- receive an instruction from another communication, that initiated the group call, to record sound received during the group call;
- in response to the instruction, automatically begin recording sound received during the group call in a memory of the communication device;
- when an operation indicating that the user is participating in the group call is received during the group call, notify the other communication device that initiated the group call that the user is participating in the group call; and,
- when the group call is terminated while the sound is still being recorded, automatically stop the recording.

12. A call control method in a communication device with a function to participate in a group call with a plurality of other communication devices in a half-duplex communication system, wherein the method comprises:
- automatically accepting an incoming group call even when a user of the communication device does not perform any operation for receiving the group call;
- receiving an instruction from another communication, that initiated the group call, to record sound received during the group call;
- in response to the instruction, automatically beginning recording sound received during the group call in a memory of the communication device;
- when an operation indicating that the user is participating in the group call is received during the group call, notifying the other communication device that initiated the group call that the user is participating in the group call; and,
- when the group call is terminated while the sound is still being recorded, automatically stopping the recording.

* * * * *